United States Patent
Ueno

(10) Patent No.: US 9,456,145 B2
(45) Date of Patent: Sep. 27, 2016

(54) APPARATUS FOR PHOTOGRAPHING THAT CARRIES OUT A PRE-FLASH PHOTOGRAPHY

(71) Applicant: RICOH IMAGING COMPANY, LTD., Tokyo (JP)

(72) Inventor: Hirotaka Ueno, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 64 days.

(21) Appl. No.: 14/317,454

(22) Filed: Jun. 27, 2014

(65) Prior Publication Data

US 2015/0009396 A1    Jan. 8, 2015

(30) Foreign Application Priority Data

Jul. 3, 2013  (JP) ................. 2013-139962

(51) Int. Cl.
| | |
|---|---|
| *H04N 5/235* | (2006.01) |
| *G03B 15/05* | (2006.01) |
| *G03B 7/17* | (2014.01) |
| *G03B 7/08* | (2014.01) |
| *H04N 5/238* | (2006.01) |
| *H04N 5/243* | (2006.01) |

(52) U.S. Cl.
CPC .......... *H04N 5/2354* (2013.01); *G03B 7/08* (2013.01); *G03B 7/17* (2015.01); *G03B 15/05* (2013.01); *H04N 5/238* (2013.01); *H04N 5/243* (2013.01); *G03B 2215/05* (2013.01)

(58) Field of Classification Search
CPC .. H04N 5/235; H04N 5/2353; H04N 5/2354; H04N 5/2256; H04N 5/2352; H04N 5/353; H04N 5/238; H04N 1/6086; H04N 1/02885; H04N 1/0429; H04N 1/19457; G03B 15/05; G03B 7/17; G03B 7/08; G03B 7/10; G03B 2215/05; G03B 21/64; G03B 9/02
USPC .......................................................... 348/371
See application file for complete search history.

(56) References Cited

U.S. PATENT DOCUMENTS

| | | | |
|---|---|---|---|
| 5,550,587 A | 8/1996 | Miyadera | |
| 6,272,292 B1* | 8/2001 | Iwasaki ................ | G03B 7/16 396/157 |
| 7,064,788 B2 | 6/2006 | Yoshida et al. | |
| 9,167,172 B2* | 10/2015 | Takaiwa ............... | H04N 5/2354 |
| 2007/0248330 A1* | 10/2007 | Pillman ................ | G06T 7/2013 386/224 |
| 2008/0199172 A1* | 8/2008 | Hamada ................ | G03B 7/16 396/157 |

(Continued)

FOREIGN PATENT DOCUMENTS

| | | |
|---|---|---|
| JP | 2002-359774 | 12/2002 |
| JP | 2007-086181 | 4/2007 |

*Primary Examiner* — Pritham Prabhakher
(74) *Attorney, Agent, or Firm* — Greenblum & Bernstein P.L.C.

(57) ABSTRACT

An apparatus for photographing by using an electronic flash has a photography controller that carries out a pre-flash photography by emitting strobe light in a pre-flash exposure period and subsequently carries out a main flash photography by emitting strobe light; and an exposure adjuster that sets at least one exposure value associated with the pre-flash photography and/or the main flash photography. The exposure adjuster sets an aperture value of a diaphragm that suppresses an occurrence of saturation in image-pixel signals that are generated in an image sensor in the pre-flash exposure period. The photography controller drives the diaphragm in accordance to the set aperture value for the pre-flash photography.

20 Claims, 4 Drawing Sheets

(56) References Cited

U.S. PATENT DOCUMENTS

| | | | | |
|---|---|---|---|---|
| 2010/0066889 A1* | 3/2010 | Ueda | ............... | G02B 7/102 348/333.01 |
| 2010/0194931 A1* | 8/2010 | Kawaguchi | ............... | H04N 5/232 348/240.99 |
| 2011/0044680 A1* | 2/2011 | Fukui | ............... | G03B 15/03 396/164 |
| 2012/0177352 A1* | 7/2012 | Pillman | ............... | H04N 5/2354 396/61 |
| 2012/0194689 A1* | 8/2012 | Kodama | ............... | H04N 5/2351 348/220.1 |
| 2012/0312960 A1* | 12/2012 | Mine | ............... | H04N 5/347 250/206 |
| 2013/0057740 A1* | 3/2013 | Takaiwa | ............... | H04N 5/2354 348/297 |

* cited by examiner

APPARATUS FOR PHOTOGRAPHING THAT CARRIES OUT A PRE-FLASH PHOTOGRAPHY

BACKGROUND OF THE INVENTION

1. Field of the Invention

This invention relates to a camera that is capable of carrying out flash photography using a strobe, and particularly to controlling an exposure during pre-flash photography.

2. Description of the Related Art

A recent digital camera with a flash photography/shooting function carries out pre-flash photography before main flash photography to accurately detect the distance of an object. When a release button is depressed fully, strobe light is emitted from an electronic flash and a distance from the camera to a target object is detected using light reflected off the target object. Then, an amount of light (Guide Number) to be emitted from an electronic flash/strobe during main flash photography is determined based on the object distance detected in the pre-flash photography, and the main flash photography is carried out on the basis of the obtained Guide Number.

In the case of a compact type digital camera, pre-flash photography utilizing a "through-image" mode is carried out. Concretely, when a release button is depressed fully, a through-image, which is a real-time image captured by a lens, is displayed on a monitor, the image-pixel signals are read immediately after the button is fully depressed and strobe light is emitted from the electronic flash. Then, an object distance is calculated from the difference between image-pixel signals generated in pre-flash photography and image-pixel signals generated before the pre-flash photography. Thus, an amount of light, i.e., Guide Number appropriate for an object is determined. The pre-flash photography process is disclosed, for example, in JP2007-86181A1 and JP2002-359774A1.

The above pre-flash photography is carried out regardless of the ambient illumination of the photography location. An exposure value for pre-flash photography is not selected by a user or an auto exposure operation, but determined in advance from an expected ambient illumination and/or expected object distance. Therefore, pre-flash photography with improper exposure is carried out occasionally. When an object to be photographed is very close to a camera, an amount of light that bounces off the object may exceed a range that is appropriate for exposure, in which condition image-pixel signals read from an image sensor include saturated signals. Also, when an object is relatively far from the camera and located in a position that can be reached by only a limited amount of strobe light, output levels of the read image-pixel signals are extremely low because of an insufficient amount of reflected light, so that an accurate object distance cannot be detected.

SUMMARY OF THE INVENTION

The present invention is directed to carry out pre-flash photography based on an accurate exposure.

An apparatus for photographing by using an electronic flash, according to the present invention, has a photography controller that carries out a pre-flash photography by emitting strobe light in a pre-flash exposure period and subsequently carries out a main flash photography by emitting strobe light; and an exposure adjuster that sets at least one exposure value associated with the pre-flash photography and/or the main flash photography. The exposure adjuster sets an aperture value of a diaphragm that suppresses an occurrence of saturation in image-pixel signals that are generated in an image sensor in the pre-flash exposure period. The photography controller drives the diaphragm in accordance to the set aperture value for the pre-flash photography.

An apparatus for photographing by using an electronic flash, according to another aspect of the present invention has an electronic flash configured to emit strobe light; and a photography controller that carries out a pre-flash photography by emitting strobe light in a pre-flash exposure period and subsequently carries out a main flash photography by emitting strobe light in accordance to an operation to a release button. The photography controller carries out at least one of an adjustment of an aperture value of a diaphragm and an adjustment of a gain value in response to at least one of the distance of an objected that is detected by an AF process and the brightness of an object that is detected by light metering.

BRIEF DESCRIPTION OF THE DRAWINGS

Hereinafter, the preferred embodiment of the present invention is described with reference to the attached drawings.

DESCRIPTION OF THE PREFERRED EMBODIMENTS

Figure 1:
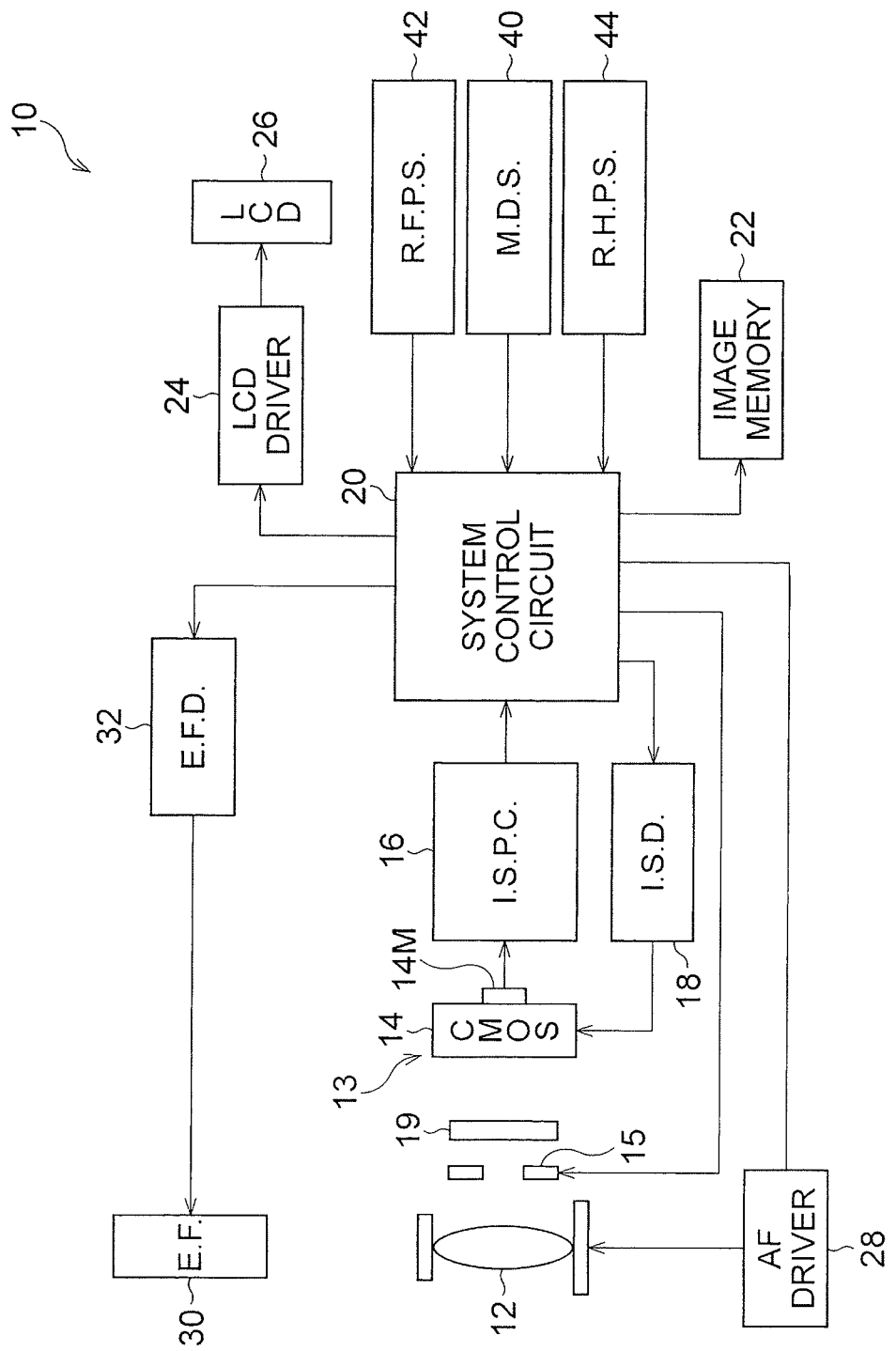
FIG. 1 is a block diagram of a digital camera according to the present embodiment.

The digital camera 10 is a compact-type digital camera with a system control circuit 20 including a CPU, ROM unit, and a RAM unit that controls the motion of the digital camera 10. A program for controlling the digital camera 10 is stored in the ROM unit. When electric power is turned on, a given photography mode is set, in which a through-image or live image is displayed on an LCD 26 provided on the back surface of the digital camera 10.

Light reflected off a target object enters into a photographing optical system 12 including a focusing lens, and light passing through the photographing optical system 12 reaches an image sensor 14 in an image sensor unit 13 to form an object image on a photo-sensitive area of the image sensor 14. The image sensor 14 herein is an X-Y address type image sensor such as a CMOS image sensor, and the rolling method that reads image-pixel signals line by line is the applied exposure method.

While the through-image is displayed, one field or frame's worth of image-pixel signals are read from the image sensor 14 at predetermined time intervals (e.g., 1/60 or 1/50 seconds). On the light-receiving surface of the image sensor 14, a color filter array, in which R, G, and B elements are Bayer-arrayed, is disposed.

Accordingly, R, G, and B analog image-pixel signals are output from the image sensor 14. The read image-pixel signals are subjected to an amplification or gain process and an A/D conversion process on an initial processing circuit 14M adjacent to the image sensor 14. Note that the gain process may be carried out in the image sensor 14.

The digitized image-pixel signals are fed to an image signal processing circuit 16. An image-sensor driver 18 drives the image sensor 14 on the basis of a control signal fed from the system control circuit 20, and a frame rate and an exposure period at one frame/field interval is set by the system control circuit 20.

The digital image-pixel signals are subjected to a series of image signal processes on the image signal processing circuit 16, such as a white balance process, color conversion process, etc. Consequently, digital color image signals such as R, G, and B image signals are generated. An LCD driver 24 drives the LCD 26 on the basis of the generated color image signals so that a through-image is displayed on the LCD 26. While the through-image is displayed, a decimation process (down sampling) is carried out as the image-pixel signals are read from the image sensor 14.

When a release button (not shown) is depressed halfway, a release half push switch 44 is activated and light metering, an AF (Auto-Focus) process, and an auto-exposure operation are carried out. The brightness of a target object is detected from the image-pixel signals that are input to the image signal processing circuit 16.

In the AF process, the focusing lens in the photographing optical system 12 is driven in accordance to the contrast method. Also, as for the auto exposure operation, an exposure period (shutter speed) and an aperture value of a diaphragm (iris) 15 provided in the photographing optical system 12 (not shown) are calculated in the system control circuit 20.

When the release button is depressed completely, a photographing process is carried out in response to an operation signal fed from a release full push switch 42. Concretely, a shutter 19 opens for an exposure period corresponding to the calculated shutter speed, and the diaphragm 15 is driven such that it opens to a degree corresponding to the calculated aperture value. Thus, one frame's object image is formed on the photo-receiving area of the image sensor 14 and one frame's worth of image-pixel signals are read from the image sensor 14.

After the exposure period ends, one frame's worth of image-pixel signals are read from the image sensor 14 by the image sensor driver 18. The image-signal processing circuit 16 applies processing such as white-balance processing to the image-pixel signals to generate color still-image data. The generated still-image data are temporarily stored in a memory (not shown) and output to the system control circuit 20 to compress the still image data. The compressed still-image data are then recorded in an image memory card 22.

An electronic flash 30 emits strobe light (speed light) toward a target object based on a driving signal fed from an electronic flash driver 32. A mode dial switch 40 detects an electronic flash mode. A user may select the electronic flash mode by operating a mode dial (not shown). In the electronic flash mode, pre-flash photography and main flash photography are carried out in that order. The system control circuit 20 controls the pre-flash photography and the main flash photography.

Figure 2:
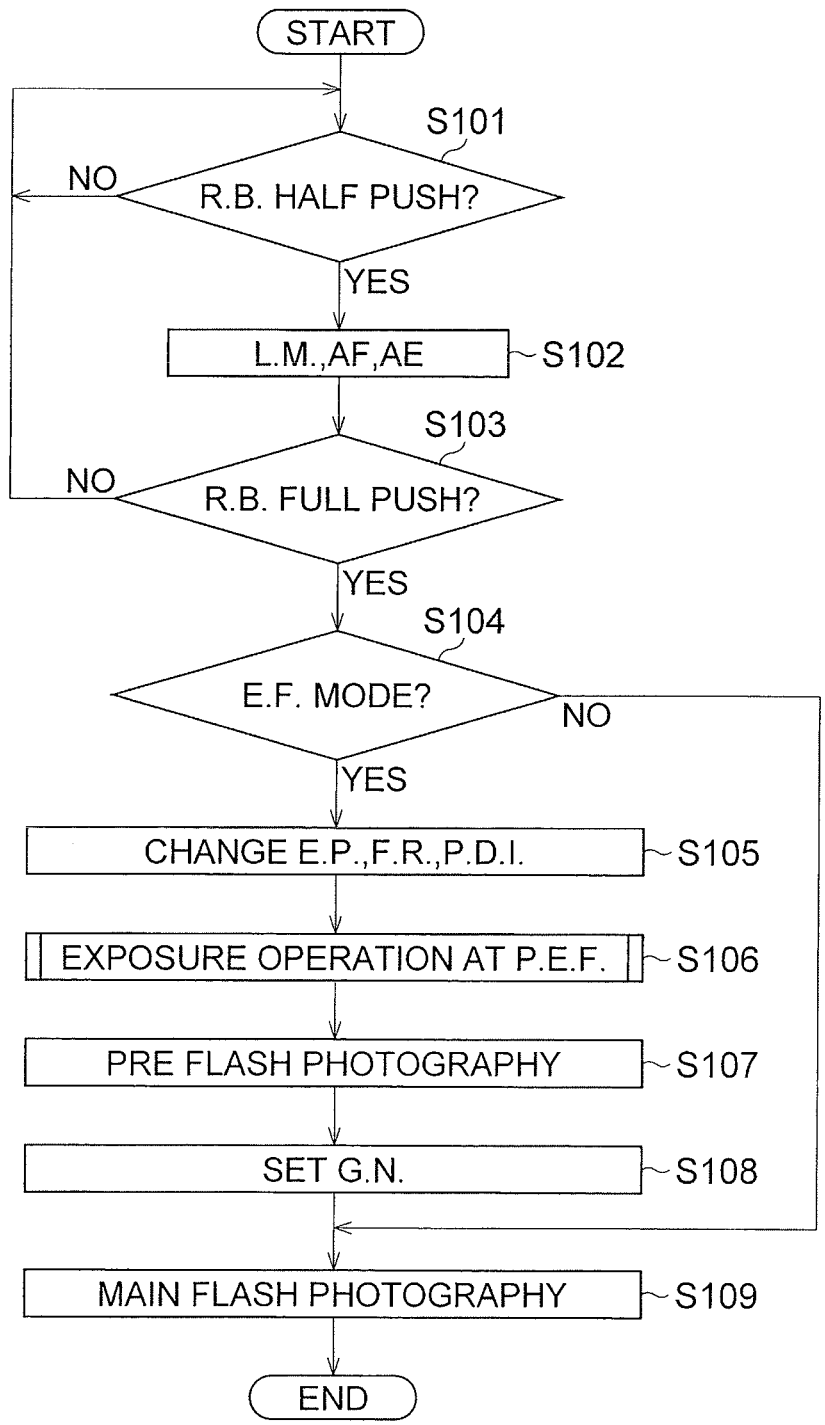
FIG. 2 is a flowchart of a series of photographing processes controlled by the system control circuit.
Figure 3:
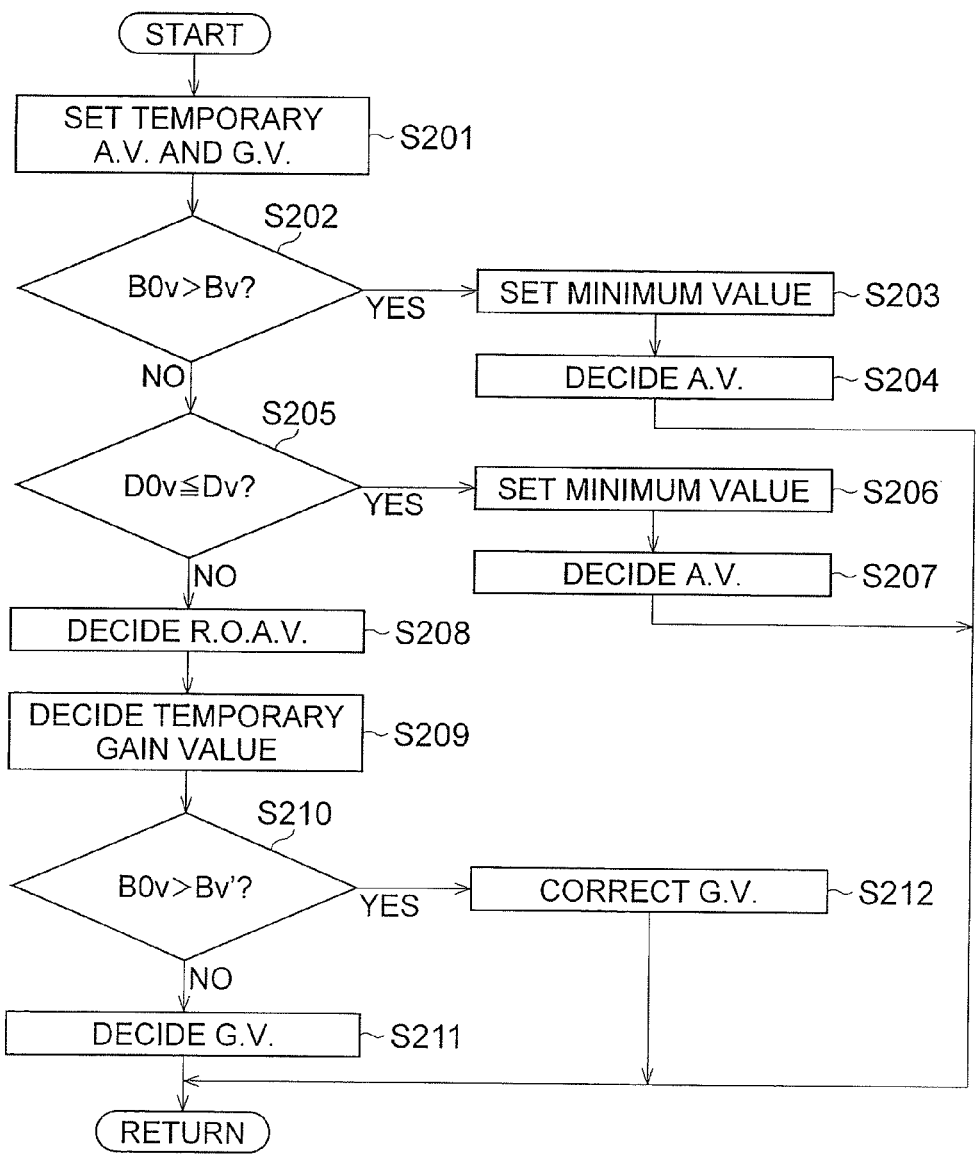
FIG. 3 is a subroutine of Step S106 in FIG. 2.
Figure 4:
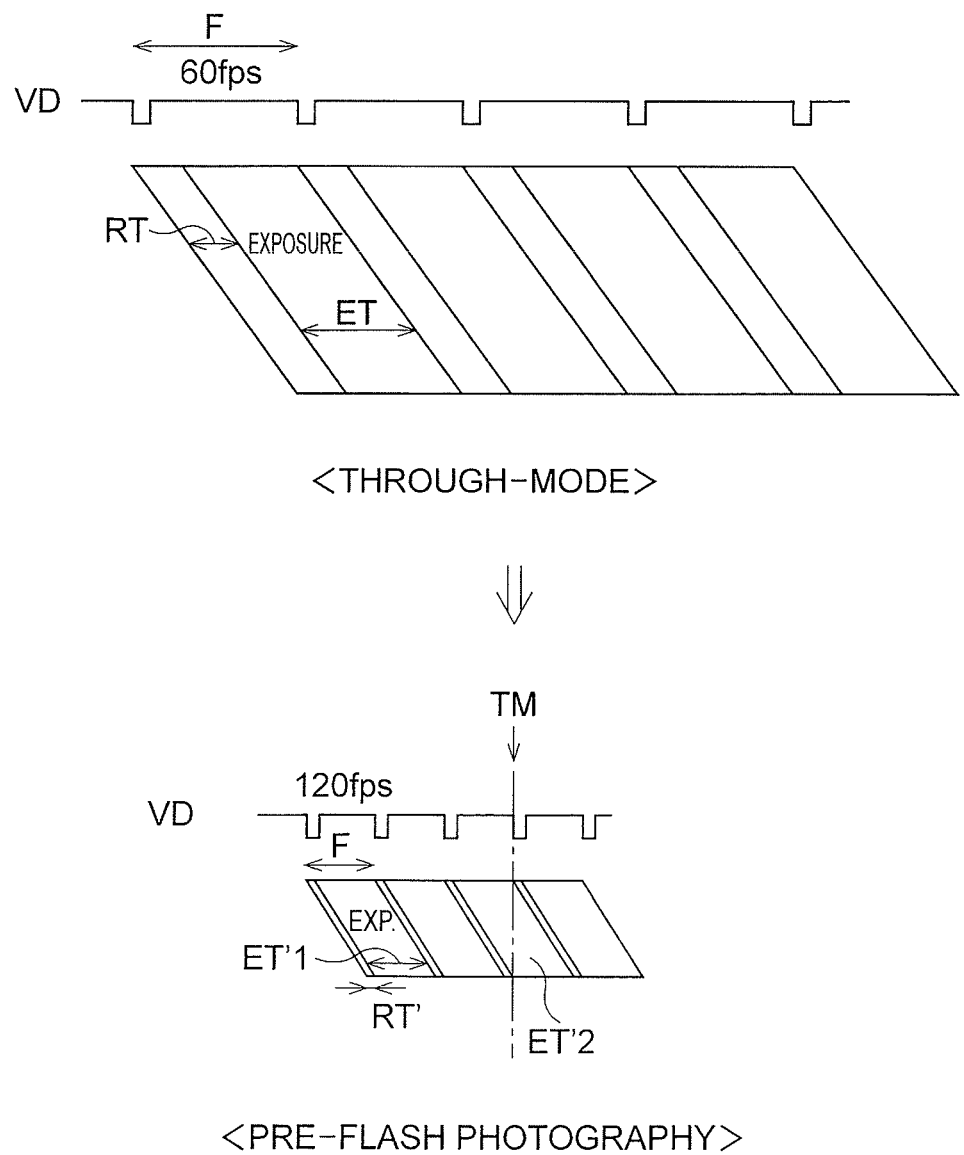
FIG. 4 is a timing chart of pre-flash photography.

FIG. 2 is a flowchart of a series of photographing processes controlled by the system control circuit. FIG. 3 is a subroutine of Step S106 in FIG. 2. FIG. 4 is a timing chart of pre-flash photography. With reference to FIGS. 2-4, an operation for obtaining an exposure value from pre-flash photography is explained.

As described above, when the release button is depressed halfway, light metering, an AF process, and an exposure process associated with a main photography process are carried out (S101 and S102). When the release button is depressed fully (S103), a photography process is carried out. In a normal photography mode, a photography process without the electronic flash 30 is carried out (S109). At this time, a process for reading image-pixel signals is terminated at the start of the photography process.

On the other hand, in the case of the electronic flash mode (S104), the process for reading the image-pixel signals is continued immediately after the full-depression of the release button, and a frame rate and exposure period in one frame interval are changed. Furthermore, a decimation interval for the down sampling is changed (S105). Concretely speaking, the frame rate is changed to a double frame rate (=120 fps). Also, as shown in FIG. 4, an exposure period ET' becomes a maximum tolerable exposure period, so that a non-exposure period RT becomes substantially zero. Then, in accordance to the raised frame rate, an interval of pixel decimation is changed to a relatively larger interval than the pixel decimation interval of the through-image mode, i.e., before the release button is depressed fully. A ratio of the exposure period "ET'" to one frame/field interval "F" is larger than the same ratio with the exposure period "ET". However, the exposure period ET' is shorter than the exposure period ET during the through-image mode, since the frame rate has been increased. Also, the increase of frame rate can be easily realized by enlarging the pixel decimation interval. These changes of parameter associated with the reading of image-pixel signals are based on the control of the system control circuit 20.

In Step S106, an exposure operation for pre-flash photography is carried out to determine exposure parameters such as an aperture value of the diaphragm 15 and a gain value of image-pixel signals read from the image sensor 14. On the other hand, an amount of strobe light for pre-flash photography is determined in accordance to a Guide Number corresponding to the sensitivity of the image sensor 14. In Step S107, pre-flash photography is carried out in accordance to the exposure value set by Step S106. At this time, the electronic flash 30 emits strobe light at a timing "TM" so that all of the pixel lines on the photo-receiving surface of the image sensor 14 are exposed (see FIG. 4). The reading of the image-pixel signals is terminated after pre-flash photography. In the pre-flash photography, an aperture value of the diaphragm 15 and a gain value are temporarily set to preliminary values; actual aperture and gain values for the pre-flash photography are decided upon later when a determination is made as to whether or not image-pixel signals of an object have been saturated with strobe light or stationary light other than strobe light. Specifically, an aperture is set to a full-open aperture value as soon as possible, and a gain value is adjusted such that an output level of image-pixel signals read from the image sensor unit 13 corresponds to a mid-range value or another value relatively close to the mid-range value (not near the minimum or maximum value) with respect to the dynamic range of the image sensor 14. Note that an object may be all of objects that is captured by the photographing optical system 12 or may be a specific target object such as a face.

In Step S108, an amount of strobe light that is emitted during main flash photography is determined based on the distance of an object. The distance from the target object to the camera is obtained from the difference between output levels of image-pixel signals generated in the exposure period "ET'2" during emission of strobe light and output levels of image-pixel signals generated in the exposure period "ET' 1" before strobe light is emitted (see FIG. 4). This difference occurs because an amount of light reflected off the object during pre-flash photography is greater than that during non-flash photography by an amount of strobe light. Note that luminance values of image-pixel signals generated in the exposure periods "ET'1" and "ET'2" are based on the same gain value, the same frame rate, and the same pixel decimation interval, respectively. Also, output levels of image-pixel signals generated in the exposure period "ET'1" after strobe light is emitted may be used. In Step S109, main flash photography using the electronic flash 30 is carried out in accordance to the decided Guide Number (GN).

Hereinafter, an exposure operation regarding pre-flash photography is explained with reference to FIG. 3.

In Step S201, a full-open value is initially set as a temporary aperture value, and a gain minimum value (herein, 1.0) is initially set as a temporary gain value. In Step S202, it is determined whether a measured brightness value "BOv" of an object is greater than a brightness value "Bv" that is calculated based on the APEX system. The brightness value "Bv" is obtained by the following formula from the APEX system:

$$Bv = Av + Tv - Sv \quad (1)$$

Herein, "Av" represents an aperture value (F number), "Tv" represents an exposure period "ET'" during the pre-flash photography, and "Sv" represents the sensitivity of the image sensor 14. Note that "Sv" corresponds to the sensitivity defined by ISO and the value of "Sv" is defined based on a gain value=1.

On the other hand, the brightness value "BOv" is obtained by calculating a representative luminance value of one frame/field's worth of image-pixel signals that are read from the image sensor 14 immediately after the release button is depressed fully. The representative luminance value is, for example, an average luminance value, maximum luminance value, etc.

In Step S202, it is determined whether light other than strobe light (i.e., stationary light) causes saturation in image-pixel signals. The above formula (1) is derived from the formula based on the APEX system that selects an appropriate exposure value (Ev). When the measured luminance value "BOv" is larger than the calculated luminance value "Bv", at least a portion of the image-pixel signals are considered to be saturated.

When it is determined at Step S202 that "BOv" is larger than "Bv", a gain value is set to 1. Then, a given aperture value (F number) that is smaller than a full-open aperture value is decided (S203 and S204). Concretely, an aperture value corresponding to a maximum opening of the diaphragm 15 that suppresses saturation in the image-pixel signals is decided. With respect to the value of "Av" (F number), the larger the opening of the diaphragm 15, the smaller the value of "Av" is. Therefore, a smaller aperture value that is close to the full-open aperture value is set. Such a relatively small aperture value may be obtained by repeating the calculation using the formula (1) while raising an aperture value stepwise until the formula (1) is satisfied.

On the other hand, when it is determined at Step S202 that the calculated brightness value "Bv" is greater than or equal to the measured brightness value "BOv", the distance of an object "DOv" (hereinafter called "provisional distance of an object") that is detected by an AF process is compared with the distance of an object "Dv" that is calculated by the following formula (S205):

$$Dv = Gv(Sv) - Av \quad (2)$$
$$= Gv(ISO100) + (Sv - K) - Av$$

The formula (2) is derived from the formula representing the relationship between the Guide Number and the aperture value and the formula representing the relationship between the sensitivity of the image sensor and the Guide Number. Note that "Gv(SV)" represents the Guide Number in a state that the sensitivity of the image sensor 14 is "Sv", "Gv" represents the Guide Number in a state that the sensitivity of the image sensor 14 corresponds to ISO 100, and "K" represents the value of the sensitivity of the image sensor 14 corresponding to ISO 100 (herein, K=5).

On the other hand, the provisional distance of an object "DOv" is obtained from a position of the focusing lens. In the AF process, the focusing lens moves to a focusing position with respect to a target object (e.g., a central object in an image circle, or the face of a person). Therefore, the provisional distance of an object "Dv" can be obtained from a focal distance corresponding to the focus position of the focusing lens. Note that the provisional distance "Dv" does not represent a strict distance, but an approximate distance.

The above formula (2) is based on a well-known Guide Number Table that is used for selecting an approximate exposure value in flash photography. In the case of "DOv"<"Dv", an actual distance of an object is shorter than that estimated by the formula (2), so that at least a portion of the image-pixel signals would be considered to be saturated in the pre-flash photography. Therefore, a gain value is set to a minimum value (=1) (S206). Then, in Step S207, an aperture value is set to a minimum aperture value for a condition in which image-pixel signals are not saturated, similarly to Step S204.

On the other hand, in the case of "DOv">"Dv", it is considered that a target object is relatively far from the camera 10, so that an aperture value is set to a full-open aperture value (S208). Also, a gain value is temporarily set to a value such that the distance of an object "Dv" calculated by the formula (2) coincides with the provisional distance of an object "DOv" (S209). Namely, a gain value is increased such that an output level of image-pixel signals corresponds to a middle range in the dynamic range of the image sensor 14.

In Step S210, a modified brightness value "Bv'" is calculated with the temporarily decided gain value and the formula (1) to determine whether the measured brightness value "BOv" is larger than the modified brightness value "Bv'". When it is determined that the "BOv" is larger than "Bv'", the gain value is modified again (S212). This is because the intensity of stationary light is considered to be relatively strong despite an object being relatively far from the camera 10, and some pixel output level in image-pixel signals would exceeds an maximum value of the dynamic range of the image sensor 14 if the temporary gain value is used directly. Herein, the gain value is modified such that the modified brightness value "Bv'" is greater than or equal to the measured brightness value "BOv".

On the other hand, when it is determined at Step S210 that "BOv" is equal to or smaller than "Bv'" ("BOv" "Bv'"), the intensity of stationary light is considered to be relatively weak and an object is relatively far from the camera. Therefore, in Step S211, the temporary gain value is used directly.

In this way, the camera 10 according to the present embodiment carries out pre-flash photography and main flash photography by using the electronic flash 30 when the electronic flash mode is selected. During pre-flash photography, whether or not the aperture value of the diaphragm 15 can be set to a full-open aperture value is determined based on the measured brightness of the object and the distance obtained by the AF process. Thus, an amount of reflected light becomes appropriate value. Furthermore, when the full-open aperture value is set, a gain value in the image sensor unit 13 is increased such that the output level of image-pixel signals from the image sensor unit 13 corresponds to a mid-range value with respect to the dynamic range of the image sensor 14. Thus, luminance level of the object becomes a level that is adequate to the detection of the distance of an object. Pre-flash photography is carried out based on the set full-open aperture value and image-pixel signals are subjected to a gain process at the adjusted gain value.

Thus, the distance from the camera to the object can be determined more accurately than that obtained by the AF process. Also, an amount of reflected light by pre-flash photography can be detected accurately with one frame/field's worth of image-pixel signals since the aperture value is adjusted to avoid saturation of the image-pixel signals. Consequently, the distance of an object can be accurately detected regardless of the target object's position, which may be close to or far from the camera, and regardless of the pixel area of target object' image. Thus, an amount of strobe light during main flash photography can be set to an adequate amount in accordance to the accurate distance of an object. Especially, an aperture value is set to a full-open aperture value or set to an aperture value that is as small as possible so that an opening of the diaphragm becomes as large as possible. Thus, strobe light can reach to an object that is far from the camera sufficiently even if intensity of strobe light is weak as the compact type camera. On the other hand, when pre-flash photography is carried out in a situation with intense stationary light, an aperture value is not set to a full-open aperture value, but instead to a maximum among aperture values that can suppress saturation.

Also, the amount of strobe light during pre-flash photography is determined by a Guide Number corresponding to the sensitivity of the image sensor, which is different from the main flash photography that varies the amount of strobe light to control an exposure. Namely, the amount of reflected light for pre-flash photography is adjusted by the degree of the opening of the diaphragm (not an adjustment of an amount of strobe light) to produce an appropriate output level of image-pixel signals in accordance to the sensitivity of the image sensor 14.

Furthermore, the camera according to the present embodiment adjusts the gain value for image-pixel signals on the basis of the provisional distance detected by the AF process, in addition to an aperture value. Thus, an output level of the image sensor unit 13 corresponds to the output level of a mid-range value of the dynamic range of the image sensor 14, even though an object is far from the camera and ambient illumination is very weak. In other words, the output level of image-pixel signals that are output from the image sensor unit 13 is not a low level that is close to minimum value of the dynamic range of the image sensor 14. Thus, the distance of an object can be obtained accurately. On the other hand, a final output level of image-pixel signals may exceed the dynamic range of the image sensor 14 if stationary light is strong. Therefore, whether an output level of image-pixel signals corresponding to an object exceeds the dynamic range of the image sensor by stationary light is determined after the gain value is adjusted. Thus, an occurrence of saturation due to an increase in the gain value is prevented and an adequate gain value is decided.

In the present embodiment, the reading of image-pixel signals continuous after the release button is depressed fully, and frame rate is increased at this time so as to shorten a pre-flash exposure period. Thus, saturation is prevented even if an aperture value is set to a full-open aperture value. Note that the shortening of the pre-flash exposure period is effective in a state that an aperture value is fixed value such as a full-open aperture value. Also, in the present embodiment, a pixel decimation interval is enlarged in accordance to the change of frame rate. Thus, one field/frame's worth of image-pixel signals can be generated though the pre-flash exposure period is short. Note that a timing of emitting of strobe light during the pre-flash photography may be set to a timing that can obtain light reflected off a partial target object instead of the above timing "TM".

As for an exposure operation for pre-flash photography, an aperture value may be adjusted in a condition that a gain value is constant, whereas a gain value may be adjusted in a condition that an aperture value is constant. Namely, at least one of an adjustment of an aperture value of a diaphragm and an adjustment of a gain value may be carried out in response to at least one of the distance of an object that is detected by an AF process and the brightness of an object that is detected by light metering.

A single reflex type camera (e.g., mirror-less camera) may be applied and the brightness of an object may be detected by an exclusive photometer. Also, the AF process based on phase-difference method may be applied. An external electronic flash may be used. As for an image sensor, solid state image sensor such as CCD may be applied.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2013-139962 (filed on Jul. 3, 2013), which is expressly incorporated herein by reference, in its entirety.

The invention claimed is:

1. An apparatus for photographing by using an electronic flash, comprising:
a photography controller that carries out a pre-flash photography by emitting strobe light in a pre-flash exposure period and subsequently carries out a main flash photography by emitting strobe light;
an exposure adjuster that sets at least one exposure value, said exposure adjuster setting an aperture value of a diaphragm that suppresses an occurrence of saturation in image-pixel signals that are generated in an image sensor in the pre-flash exposure period, said photography controller driving said diaphragm in accordance to the set aperture value for the pre-flash photography, and
an image sensor driver that drives said image sensor, said photography controller controls said image sensor driver to set the pre-flash exposure period to be shorter than an exposure period in one frame/field interval during a through-mode.

2. The apparatus of claim 1, wherein the exposure adjuster sets a maximum value among aperture values that are capable of suppressing saturation in the image-pixel signals when carrying out the pre-flash photography.

3. The apparatus of claim 1, wherein said exposure adjuster determines whether the aperture value can be set to a full-open aperture value.

4. The apparatus of claim 3, wherein said exposure adjuster determines whether the aperture value can be set to a full-open aperture value based on stationary light.

5. The apparatus of claim 4, wherein said exposure adjuster determines whether the aperture value can be set to a full-open position on the basis of the brightness of an object that is measured and the brightness of an object that is calculated on the basis of APEX system.

6. The apparatus of claim 3, wherein said exposure adjuster determines whether the aperture value can be set to a full-open aperture value based on the distance of an object.

7. The apparatus of claim 6, wherein said exposure adjuster determines whether the aperture value can be set to a full-open aperture value on the basis of a provisional distance of an object that is obtained by an AF process and a calculated distance of an object that is calculated in accordance to a relationship between a Guide Number and the sensitivity of said image sensor and a relationship between a Guide Number and an aperture value.

8. The apparatus of claim 3, wherein said exposure adjuster adjusts a gain value for the image-pixel signals such that an output level of image pixel signals that are used for obtaining the distance of an object becomes an output level within the dynamic range of said image sensor.

9. The apparatus of claim 8, wherein said exposure adjuster increases the gain value such that an output level of image-pixel signals that are used for obtaining the distance of an object becomes an output level within a middle range among the dynamic range of said image sensor.

10. The apparatus of claim 9, wherein said exposure adjuster determines whether output levels of the image-pixel signals that are subjected to a gain process based on the adjusted gain value reach a saturation level.

11. The apparatus of claim 1, wherein said photography controller changes at least one of a frame rate and an interval of pixel decimation.

12. The apparatus of claim 1, wherein said photography controller drives said strobe light in accordance to an amount of strobe light based on the sensitivity of said image sensor.

13. The apparatus of claim 1, wherein said exposure adjuster sets an aperture value in response to a value associated with an exposure, the value being detected when a release button is depressed halfway.

14. An apparatus for photographing by using an electronic flash, comprising:
a photography controller that carries out a pre-flash photography by emitting strobe light in a pre-flash exposure period and subsequently carries out a main flash photography by emitting strobe light; and
an exposure adjuster that sets at least one exposure value, said exposure adjuster setting an aperture value of a diaphragm that suppresses an occurrence of saturation in image-pixel signals that are generated in an image sensor in the pre-flash exposure period, said photography controller driving said diaphragm in accordance to the set aperture value for the pre-flash photography,
wherein said image sensor comprises an X-Y address type image sensor using a rolling shutter method, said photography controller raising a ratio of the pre-flash exposure period to one frame/field interval relative to a ratio during a through mode to allow all of the pixel-lines in said image sensor to be exposed by strobe light in the pre-flash photography.

15. An apparatus for photographing by using an electronic flash, comprising:
a photography controller that carries out pre-flash photography by emitting strobe light in a pre-flash exposure period and subsequently carries out main flash photography by emitting strobe light;
an exposure adjuster that sets at least one exposure value, said exposure adjuster setting an aperture value of a diaphragm that suppresses an occurrence of saturation in image pixel signals that are generated in an image sensor in the pre-flash exposure period, said photography controller driving said diaphragm in accordance with the set aperture value for the pre-flash photography, said exposure adjuster adjusts an aperture value to a value that suppresses an occurrence of saturation before performing pre-flash photography; and
said exposure adjuster controls the diaphragm such that an opening degree of the diaphragm corresponds to the adjusted aperture value when performing pre-flash photography.

16. The apparatus of claim 15, further comprising an image sensor driver that drives said image sensor, said photography controller controls said image sensor driver to set the pre-flash exposure period that is shorter than an exposure period in one frame/field interval during a through-mode.

17. The apparatus of claim 15, wherein said exposure adjuster determines whether the aperture value can be set to a full-open aperture value.

18. The apparatus of claim 17, wherein said exposure adjuster determines whether the aperture value can be set to a full-open aperture value based on stationary light.

19. The apparatus of claim 17, wherein said exposure adjuster determines whether the aperture value can be set to a full-open aperture value based on the distance of an object.

20. The apparatus of claim 17, wherein said exposure adjuster adjusts a gain value for the image-pixel signals such that an output level of image pixel signals that are used for obtaining the distance of an object becomes an output level within the dynamic range of said image sensor.

* * * * *